US009148812B2

(12) United States Patent
Dalsgaard et al.

(10) Patent No.: US 9,148,812 B2
(45) Date of Patent: Sep. 29, 2015

(54) MOBILITY IMPROVEMENT USING INCREASED NUMBER OF MOBILITY MEASUREMENTS FOR A TIME PERIOD

(71) Applicant: Nokia Siemens Networks Oy, Espoo (FI)

(72) Inventors: Lars Dalsgaard, Oulu (FI); Mikko Saily, Sipoo (FI); Klaus I. Pedersen, Aalborg (DK); Niko Sakari Kolehmainen, Espoo (FI); Sari Kaarina Nielsen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 55 days.

(21) Appl. No.: 13/753,646

(22) Filed: Jan. 30, 2013

(65) Prior Publication Data
US 2013/0194954 A1 Aug. 1, 2013

Related U.S. Application Data

(60) Provisional application No. 61/592,260, filed on Jan. 30, 2012.

(51) Int. Cl.
H04W 24/10 (2009.01)
H04W 36/00 (2009.01)
H04W 76/04 (2009.01)
H04W 36/32 (2009.01)

(52) U.S. Cl.
CPC .......... H04W 24/10 (2013.01); H04W 36/0005 (2013.01); H04W 36/32 (2013.01); H04W 76/048 (2013.01)

(58) Field of Classification Search
CPC ... H04W 76/048; H04W 24/10; H04W 36/32; H04W 36/0005
See application file for complete search history.

(56) References Cited

U.S. PATENT DOCUMENTS

2009/0092056 A1* 4/2009 Kitazoe .................. 370/252
2009/0168728 A1* 7/2009 Pani et al. ............... 370/332
(Continued)

FOREIGN PATENT DOCUMENTS

| WO | WO 2008/114130 A2 | 9/2008 |
| WO | WO 2011/041753 A2 | 4/2011 |
| WO | WO 2011041754 A1 | 4/2011 |

OTHER PUBLICATIONS

R2-113794, 3GPP TSG-RAN WG2 Meeting #75, "Discussion on the mobility performance enhancement for co-channel HetNet deployment", Aug. 22-26, 2011, Athens, Greece.

(Continued)

Primary Examiner — Ajay Cattungal
(74) Attorney, Agent, or Firm — Harrington & Smith

(57) ABSTRACT

A method includes performing, responsive to entry into a cell, with a selected interval a number of measurements during a time period. The method also includes ceasing, after expiration of the time period, to perform the measurements that were performed responsive to the entry into the cell. The selected interval may be a maximum interval during which a measurement should be performed. Another method includes determining information to be used by a user equipment to perform, responsive to entry by the user equipment into a cell, a number of measurements using a selected interval during a time period. This other method includes signaling the information to the user equipment. Apparatus, computer program products, and systems are also disclosed.

22 Claims, 10 Drawing Sheets

(56) References Cited

U.S. PATENT DOCUMENTS

| | | | | |
|---|---|---|---|---|
| 2010/0208604 | A1* | 8/2010 | Kazmi et al. | 370/252 |
| 2010/0317346 | A1* | 12/2010 | Ali et al. | 455/436 |
| 2011/0021154 | A1* | 1/2011 | Marinier et al. | 455/67.11 |
| 2011/0263255 | A1* | 10/2011 | Alonso-Rubio et al. | 455/436 |
| 2012/0190367 | A1* | 7/2012 | Nakamori et al. | 455/436 |
| 2012/0244903 | A1* | 9/2012 | Fong et al. | 455/517 |
| 2012/0281563 | A1* | 11/2012 | Comsa et al. | 370/252 |
| 2012/0327797 | A1* | 12/2012 | Siomina et al. | 370/252 |
| 2013/0084862 | A1* | 4/2013 | Zou et al. | 455/436 |
| 2013/0084910 | A1* | 4/2013 | Suzuki et al. | 455/515 |
| 2013/0148534 | A1* | 6/2013 | Jung et al. | 370/252 |
| 2013/0157662 | A1* | 6/2013 | Han et al. | 455/436 |
| 2013/0163424 | A1* | 6/2013 | Goerke et al. | 370/235 |
| 2014/0038598 | A1* | 2/2014 | Ren et al. | 455/434 |
| 2014/0050102 | A1* | 2/2014 | Lee et al. | 370/242 |
| 2014/0148174 | A1* | 5/2014 | Teyeb et al. | 455/441 |
| 2015/0003275 | A1* | 1/2015 | Krishnamurthy | 370/252 |

OTHER PUBLICATIONS

R2-114005, 3GPP TSG Ran WG2 Meeting #75, "Improving Mobility towards Small Cells", Aug. 22-26, 2011, Athens, Greece.
R2-115730, 3GPP TSG-RAN WG2 Meeting #75 "Discussion of HetNet Mobility", Aug. 22-26, 2011 Athens, Greece.
R2-115731, 3GPP TSG-RAN WG2 Meeting #75bis, "HetNet mobility and DRX", Oct. 10-14, 2011. Zhuhai, China.
R2-115732, 3GPP TSG-RAN WG2 Meeting #75bis, "Re-establishment issues in HetNet scenarios", Oct. 10-14, 2011, Zhuhai, China.
R2-115745, 3GPP TSG-RAN WG2 Meeting #76, "Inter-frequency Pico cell measurements for Hetnet deployments", Nov. 14-18, 2011, San Francisco, USA.
R2-116149, 3GPP TSG-RAN WG2 Meeting #76, "HetNet large area simulation results", Nov. 14-18, 2011, San Francisco, USA.
R2-116151, 3GPP TSG-RAN WG2 Meeting #76, "Small cell detection in HetNet environment", Nov. 14-18, 2011, San Francisco, USA.
R2-116152, 3GPP TSG-RAN WG2 Meeting #76, "UE mobility state estimation and HetNet", Nov. 14-18, 2011, San Francisco, USA.
3GPP TS 36.133 V10.4.0 (Sep. 2011).
3GPP TS 36.331 V10.4.0 (Dec. 2011).
3GPP TS 36.304, V10.4.0, "3rd Generation Partnership Project; Technical Specification Group Radio Access Network; Evolved Universal Terrestrial Radio Access (E-UTRA); User Equipment (UE) procedures in idle mode (Release 10)", Dec. 2011, 33 pgs.
3GPP TSG-RAN WG2 Meeting #75bis, Zhuhai, China, Oct. 10-14, 2011, R2-115420, "Mobility robustness for fast moving UEs in HetNet", Nokia Siemens Networks, Nokia Corp., 5 pgs.
3GPP TSG RAN WG2 Meeting #76, San Francisco, USA, Nov. 14-18, 2011, R2-115919, "Need of mobility state estimation enhancement in HetNet", Huawei, 5 pgs.
3GPP TSG RAN Meeting #53, Fukuoka, Japan, Sep. 13-16, 2011, RP-111372, "Work item proposed update for LTE RAN Enhancements for diver data applications", Research in Motion UK Ltd., et al., 11 pgs.
3GPP TS36.321 V10.4.0 (Dec. 2011), "3rd Generation Partnership Project; Technical Specification Group Radio Access Network; Evolved universal terrestrial Radio Access (E-UTRA); Medium Access Control (MAC) protocol specification (Release 10)", 54 pgs.
3GPP TS36.331 V10.4.0 (Dec. 2011), "3rd Generation Partnership Project; Technical Specification Group Radio Access Network; Evolved Universal Terrestrial Radio Access (E-UTRA); Radio Resource Control (RRC); Protocol specification (Release 10)", 296 pgs.

* cited by examiner

US 9,148,812 B2

MOBILITY IMPROVEMENT USING INCREASED NUMBER OF MOBILITY MEASUREMENTS FOR A TIME PERIOD

CROSS-REFERENCE TO RELATED APPLICATIONS

The present application claims the benefit under 35 U.S.C. §119(e) of U.S. Provisional Patent Application No. 61/592,260, filed on Jan. 30, 2012, the disclosure of which is hereby incorporated by reference in its entirety.

TECHNICAL FIELD

This invention relates generally to wireless networks and, more specifically, relates to user equipment traveling through areas serviced by the wireless networks.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
DRX Discontinuous Reception
E-UTRAN Evolved UTRAN
HetNet Heterogeneous Network
HO Handover
HW Hardware
ISD Inter-Site Distance
PDCCH Physical Downlink Control CHannel
Rel Release
RF Radio Frequency
RLF Radio Link Failure
RRC Radio Resource Control
RSRP Reference Signal Received Power
RSRQ Reference Signal Received Quality
SW Software
TS technical standard
UE User Equipment
UTRAN Universal Terrestrial Radio Access Network E-UTRAN mobility in RRC connected mode contains certain challenges, as the mobility concept is based on connected mode mobility as this was defined in UTRAN. E-UTRAN mobility in RRC connected mode only supports UE-assisted network controlled mobility by use of a hard handover. This means that the mobility basically is based on the network configuring the UE with a given measurement configuration, which the UE is then required to follow according to requirements specified in 3GPP TS 36.331 and 3GPP TS 36.133, i.e., the UE performs the measurements as instructed and sends measurement reports to network according to given configured events. The network may then use the received measurement reports for initiating mobility, e.g., causing the UE to initiate handover from a current cell to stronger neighbor cells, based on the received measurement report. The basic approach in the early definition of E-UTRAN mobility was that the mobility was to be optimized for intra-frequency mobility in a homogeneous macro deployment.

Introduction of connected mode power savings through the use of DRX has lead to less frequent measurement sample requirements for the UE in order to enable full advantage of the power saving options (i.e., the UE is allowed to take fewer mobility measurement related samples when applying DRX than if continuous reception is ongoing). This approach means that even in a macro-cell layout, care has to be taken from the network side in order to ensure that the network configures the UE with mobility related parameters that are suitable for the applied DRX configuration. In general, this is a challenge for long DRX cycles in homogeneous macro layer deployment, but it is possible.

Adding a HetNet scenario to this situation adds to the challenges of mobility in E-UTRAN RRC connected mode. A heterogeneous network is a network containing cells with different characteristics such as transmission power and corresponding RF coverage area. Typically, a HetNet contains macro cells with a larger RF coverage area, and small cells with smaller RF coverage areas generally inside the larger RF coverage area of the macro cells. The smaller cells have names based typically on their RF coverage areas, such as micro, pico, and femto cells (from the largest area of the micro cell to the smallest area of the femto cell). The HetNet scenario therefore requires consideration for handover and DRX of small cells and macro cells, further adding challenges to mobility in, e.g., E-UTRAN RRC connected mode.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

SUMMARY

Figure 1:
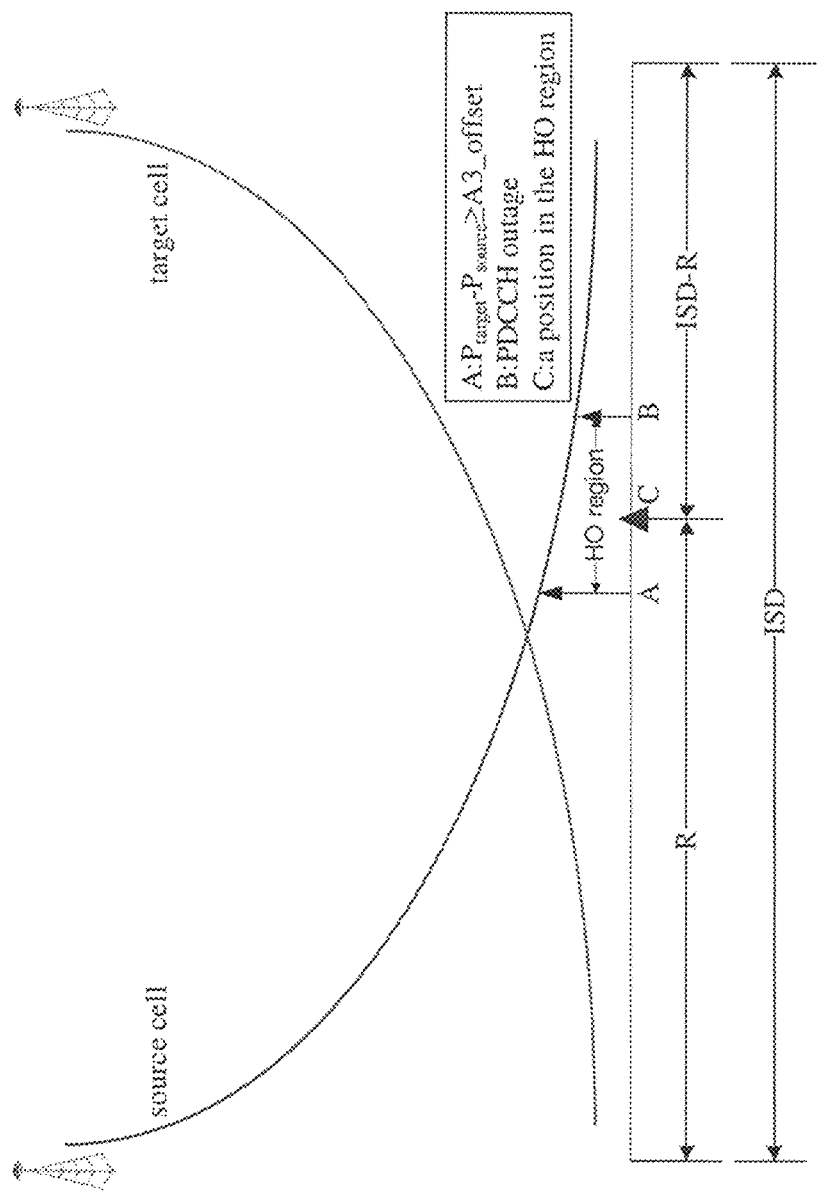
FIG. 1 illustrates a HO region between a source cell and a target cell.

This section is meant to provide an exemplary overview of exemplary embodiments of the instant invention.

An exemplary embodiment is a method. The method includes performing, responsive to entry into a cell, with a selected interval a number of measurements during a time period. The method also includes ceasing, after expiration of the time period, to perform the measurements that were performed responsive to the entry into the cell.

An additional exemplary embodiment is a computer program product comprising program code for executing the method according the previous paragraph. A further exemplary embodiment is a computer program according to this paragraph, wherein the computer program is a computer program product comprising a computer-readable medium bearing computer program code embodied therein for use with a computer.

Another exemplary embodiment is an apparatus including one or more processors and one or more memories including computer program code. The one or more memories and the computer program code configured, with the one or more processors, to cause the apparatus to perform at least the following: performing, responsive to entry into a cell, with a selected interval a number of measurements during a time period; and ceasing, after expiration of the time period, to perform the measurements that were performed responsive to the entry into the cell.

A further exemplary embodiment is an apparatus comprising: means for performing, responsive to entry into a cell, with a selected interval a number of measurements during a time period; and means for ceasing, after expiration of the time period, to perform the measurements that were performed responsive to the entry into the cell. The apparatus may be a user equipment.

In a further exemplary embodiment, a method is disclosed that comprises determining information to be used by a user equipment to perform, responsive to entry by the user equipment into a cell, a number of measurements using a selected interval during a time period. The method also includes signaling the information to the user equipment.

An additional exemplary embodiment is a computer program product comprising program code for executing the method according the previous paragraph. A further exemplary embodiment is a computer program according to this paragraph, wherein the computer program is a computer program product comprising a computer-readable medium bearing computer program code embodied therein for use with a computer.

Another exemplary embodiment is an apparatus including one or more processors and one or more memories including computer program code. The one or more memories and the computer program code configured, with the one or more processors, to cause the apparatus to perform at least the following: determining information to be used by a user equipment to perform, responsive to entry by the user equipment into a cell, a number of measurements using a selected interval during a time period; and signaling the information to the user equipment.

Yet another exemplary embodiment is an apparatus comprising: means for determining information to be used by a user equipment to perform, responsive to entry by the user equipment into a cell, a number of measurements using a selected interval during a time period; and means for signaling the information to the user equipment. The apparatus may be a base station.

A communication system is also disclosed and includes one or more of the apparatus of the preceding paragraphs.

DETAILED DESCRIPTION OF THE DRAWINGS

As described above, enabling long-period DRX in RRC connected mode is seen as one of the keys to provide good and efficient power savings on the UE side. This is especially true as many current UEs are basically always online and therefore continuously in RRC connected mode. In the future, the number of devices (e.g., UEs such as smart phones, smart devices or any other wireless connected device) that are always online is foreseen to increase dramatically and therefore there is a need to ensure that devices that apply long-period DRX in connected mode can still support robust mobility—which is currently performed using UE-assisted network controlled handover.

A general problem occurs in a HetNet environment when the UE is moving at higher velocity (e.g., 30 km/h, kilometers per hour, roughly 19 miles per hour or more) and has long-period DRX (e.g., 640 ms, milliseconds, and above). In this scenario, the reaction time using existing standardized methods for triggering outbound HO in a pico-cell is too slow. That is, from the time when, e.g., the event A3 is triggered in the UE until the point when the HO signaling starts/finalizes the quality of the serving pico cell gets so bad that HO signaling cannot be performed successfully, which leads to RLF. Our simulations have shown that the basic problem is due to too late triggering of the handover event due to long-period DRX combined with the small cell characteristics.

Figure 2:
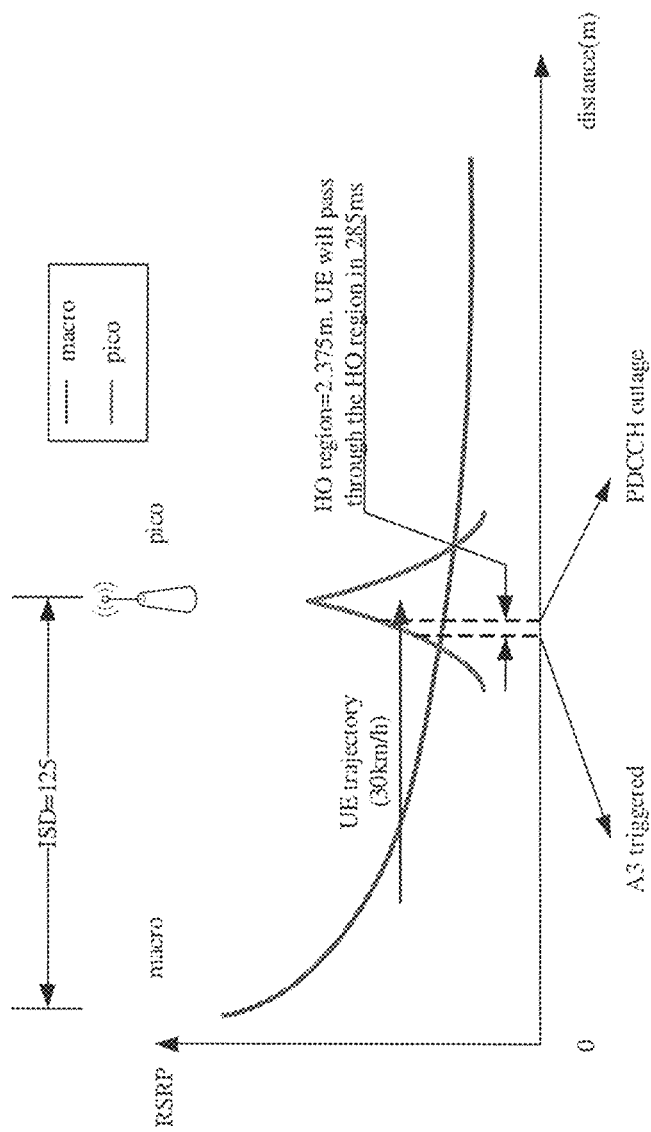
FIG. 2 is an illustration of the time it takes a UE to pass through the HO region of a pico cell when the UE is initially connected to a macro cell.

This basic problem is illustrated in FIGS. 1 and 2, which illustrate the HO region for both macro-macro scenario (FIG. 1) as well as macro-pico (and pico-macro) scenario (FIG. 2). FIG. 1 illustrates a HO region between a source cell and a target cell, having an illustrated ISD between the source and target cells. The power curves (e.g., as measured by a UE) for the source and target cells are shown. At location A, $P_{target} - P_{source}$ is greater than or equal to A3_offset. At location B, there is a PDCCH outage (e.g., a RLF). Position C is a position in the HO region. FIG. 1 is FIG. 1 from R2-113794, 3GPP TSG-RAN WG2 Meeting #75, "Discussion on the mobility performance enhancement for co-channel HetNet deployment", 22-26 Aug. 2011. Athens, Greece. The items "R" and "ISD-R" are used in R2-113794. FIG. 2 is an illustration of the time it takes a UE to pass through the HO region of a pico cell when the UE is initially connected to a macro cell. FIG. 2 is FIG. 3 from R2-113794. The UE has a trajectory of 30 km/h (kilometers per hour), and the HO region is 2.375 m (meters) and is created from the time A3 is triggered to PDCCH outage. The UE will pass through the HO region in 285 ms (milliseconds). The ISD is 125 meters. In FIG. 2, the HO region on the outbound of the pico cell (to the macro cell) will be of a similar 2.375 m HO region. Thus, handover on the outbound of a small cell is a challenge, e.g., especially with higher velocity UEs.

As can be seen from FIGS. 1 and 2, the HO region (or basic reaction time to react to and perform HO) is larger in the macro-macro case (FIG. 1) than, e.g., in the pico-macro case (FIG. 2). If the UE is then in addition also moving at 30 km/h, the impact of a small HO region becomes significant especially at higher UE velocities. If the UE is not applying DRX, the UE velocity does not have such a large impact. However, when applying DRX to the small cell characteristics, the UE measurement sampling intervals as well as UE movement starts to decrease the mobility robustness significantly. Simulation results showing the impact can be found, e.g., in the following: R2-115731, 3GPP TSG-RAN WG2 Meeting #75bis, "HetNet mobility and DRX", 10-14 Oct. 2011, Zhuhai, China; R2-116152, 3GPP TSG-RAN WG2 Meeting #76, "UE mobility state estimation and HetNet", 14-18 Nov. 2011, San Francisco, USA; and R2-115730, 3GPP TSG-RAN WG2 Meeting #75, "Discussion of HetNet Mobility", 22-26 Aug. 2011, Athens, Greece.

Figure 3:
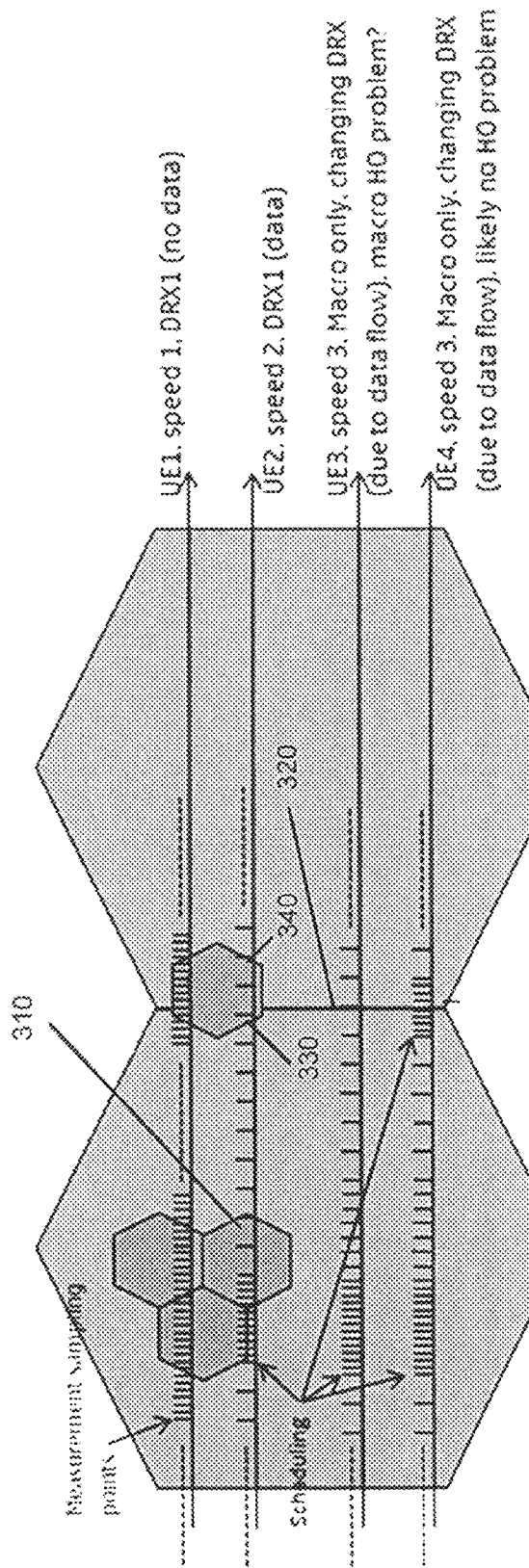
FIG. 3 is an illustration of exemplified measurement points for different UEs with the same DRX parameter settings but having different velocity and data flow.

FIG. 3 illustrates a basic reason behind this. FIG. 3 shows a set of UEs with the same basic DRX parameter settings. The small lines illustrate measurement points as they are taken by the UE. The small lines also illustrates how the measurements are increased due to the UE being scheduled as compared to when the UE is not scheduled and thereby applying DRX (assuming the UE is configured with DRX). If the UE is applying DRX, the UE may take fewer measurements and do that according to applied DRX in order to maximize the UE power savings (and this is allowed as per 3GPP TS 36.133). When the UE is then scheduled, the UE will apply an inactivity timer, which basically means that the UE is entering non-DRX for a given time. During this time (i.e., while UE is actively scheduled) the UE will perform measurements in a continuous manner and thereby more often in time. FIG. 3 therefore illustrates the measurements performed by the UE are likely to follow the applied DRX pattern, which again depends on 1) the configured DRX configuration (network controlled) and 2) the actual data scheduling (which is rather random and depends on the UE activity). This figure illustrates typical E-UTRAN DRX functionality.

Different UEs have different data flows, and the different UEs are moving at different velocities. Even though the UEs have similar DRX parameter settings, due to the differences in the data flows (and thereby the subsequently applied DRX) the UEs will perform non-homogeneous measurements following each individual UE's currently applied DRX.

The basic problem occurs due to UE measurement points combined with long-period DRX and UE movement at more than walking speed. This combination introduces multiple problems including measurement accuracy is low, and reaction time for event triggering is long due to long filtering. The problem is related to both in- and outbound mobility to small cells and to some extent actually also to macro cells. UE1 likely will not experience HO problems. UE2 will not experience HO problems to the first small cell (from left to right), as the UE is taking continuous measurements at the inbound border area, but is quite likely experiencing pico outbound HO problem due to lack of measurements at that the point in time when leaving (reference 310) the second small cell. UE2 may also experience HO problems in both inbound (reference 330) HO and outbound (reference 340) handover for the third cell. UE3 is most likely not having a HO problem (but may) for the HO between the two macro cells, as the HO region (near reference 320) in this case (as illustrated in FIG. 1) is rather large so the impact from fewer samples may not cause problems. UE4, because of scheduling, also takes a larger number of measurements near the outbound of the left macro cell and the inbound of the right macro cell, so this UE is also unlikely to have HO problems. Nonetheless, FIG. 3 illustrates several possible locations where HO problems may occur.

What is proposed here is a solution that enables robust outbound mobility for pico-macro HO for UEs moving at different velocities and having different RRC connected mode DRX applied, without the need for the network or the UE to know any details about the UE velocity and without being impacted by the applied DRX.

What is proposed in exemplary embodiments are techniques where the UE will perform additional mobility measurements for a restricted time period after entering a small cell. The measurements would be performed independently from the currently applied DRX, and the measurement interval as well as the time period (e.g., window) during which they are performed. The time period may depend on the expected worst case travelling time for a UE to move across (e.g., move through) the cell at the speed for which the generally applied mobility parameters work in a robust manner.

The techniques therefore work without the need for knowing anything about the current UE velocity, and these techniques are not impacted by the used DRX. At the same time, the techniques are not complex, while impact on the UE power consumption is rather limited.

Figure 4:
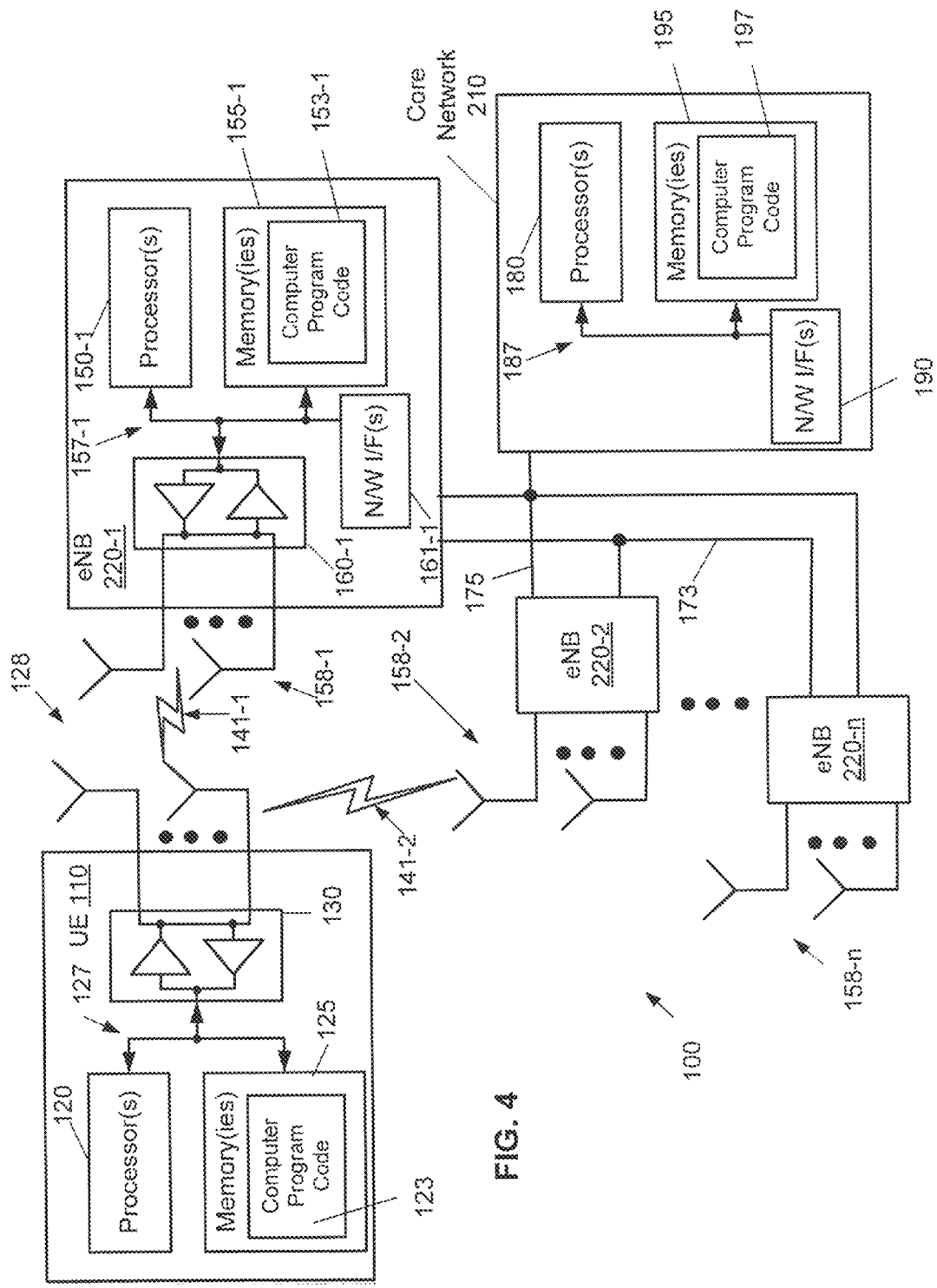
FIG. 4 illustrates an exemplary system in which the exemplary embodiments of the instant invention may be practiced.

Before proceeding with additional details of the exemplary techniques, reference is made to FIG. 4, which shows an exemplary system in which the exemplary embodiments of the instant invention may be practiced. In FIG. 4, a user equipment (UE) 110 is in wireless communication via wireless links 141-1 and 141-2 with a network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The radio network 100 includes n eNodeBs (eNBs) 220-1, 220-2, and 220-n and a core network 210. Although each eNodeB 220 is described herein as an eNodeB, some or all of these could be other base stations, remote radio heads, or any other wireless network connectivity device. The internal elements of eNodeB 220-1 will be described herein, and it is assumed the eNodeBs 220-2 and 220-n are similar. The eNodeB 220-1 includes one or more processors 150-1, one or more memories 155-1, one or more network interfaces (N/W I/F(s)) 161-1, and one or more transceivers 160-1 interconnected through one or more buses 157-1. The one or more transceivers 160-1 are connected to one or more antennas 158-1. The one or more memories 155-1 include computer program code 153-1. The one or more memories 155-1 and the computer program code 153-1 are configured to, with the one or more processors 150-1, cause the eNodeB 220-1 to perform one or more of the operations as described herein. The one or more network interfaces 161-1 communicate over networks such as the networks 173, 175.

The core network 210 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the core network 210 to perform one or more of the operations as described herein. The one or more network interfaces 190 communicate over networks such as the networks 173, 175. The core network 210 may include one or more of serving gateway, MME (mobility and management entity), and PDN (packet data network) gateway functionality (e.g., entities) as examples.

The eNodeBs 220 communicate using, e.g., network 173. The network 173 may be wired or wireless or both and may implement, e.g., an X2 interface. The core network uses one or more networks 175 to communicate with the eNodeBs 220. The network 175 may be wired or wireless or both and may implement a number of different interfaces (e.g., S1, S11).

The computer readable memories 125 and 155 may be of any type suitable to the local technical environment and may be implemented using any suitable data storage technology, such as semiconductor based memory devices, flash memory, magnetic memory devices and systems, optical memory devices and systems, fixed memory and removable memory. The processors 120 and 150 may be of any type suitable to the local technical environment, and may include one or more of general purpose computers, special purpose computers, microprocessors, digital signal processors (DSPs) and processors based on a multi-core processor architecture, as non-limiting examples.

Returning to a description of the exemplary techniques herein, in order to remove the negative impact on the mobility robustness, from the combination of having UE moving at a given velocity while at the same time having DRX applied, exemplary embodiments herein propose the following:

1) In a small cell, the network can configure the UE to perform additional measurements for a given time limited period after inbound handover. For these measurements, for example, the UE would in general perform additional cell detections and perform additional measurements like RSRP (reference signal received power) and RSRQ.

2) The measurement period would depend on the cell type (e.g., femto, pico, micro as non-limiting examples) by taking into account the estimated cell coverage. Different cell types have different max TX (transmission) power, which has direct impact on the cell's coverage area. So if using an omnidirectional antenna, the circular coverage depends on the max TX power. For other cases, the cell coverage may be different.

3) Using the estimated cell coverage and the given maximum UE velocity at which the used mobility parameters works in a robust manner (e.g., 30 km/h), the network calculates the measurement time period (see example below). Robust in this context means a successful HO procedure, e.g., no HO failure occurs (like, e.g., RLF).

4) The UE performs additional measurement after inbound handover when such behavior is configured in the cell.

5) Potentially also these additional measurements performed after the inbound handover to a given small cell type (e.g., femto, pico, micro cell and the like) could be limited to the cell's level measurements like RSRP and RSRQ measurements (for E-UTRAN) of already detected cells or even for the serving cell only in order to limit negative impact on UE power consumption due to increase in UE measurement and neighbor cell detection activity. These additional measurements may be limited to the cell's level measurements (E-UTRAN RSRP and RSRQ), only the UE would not need to perform detection of new cells (e.g., using a cell search procedure), which is typically required to be performed as part of neighbor cell measurements (requirements for E-UTRAN UEs are in 3GPP TS 36.133).

Consider the following example:

1) Cell coverage is estimated to be 100 m (meters).

2) Maximum UE velocity at which the defined HO and DRX parameters enable robust mobility is 30 km/h.

3) The network 100 indicates that UE shall perform additional measurements for 12 seconds in this cell after inbound HO.

By combining the cell type (known on the network side) and the potential UE movement scenario (deployment dependent but generally small cells are normally deployed in areas where high velocity—e.g. 120 km/h—is unlikely), it can be estimated as to what would be the worst case 'travel through' time of a small cell. For instance, the worst case cell diameter/ ((30 km/h)/3.6)), e.g., 100 m/8.3=12 seconds.

Figure 5:
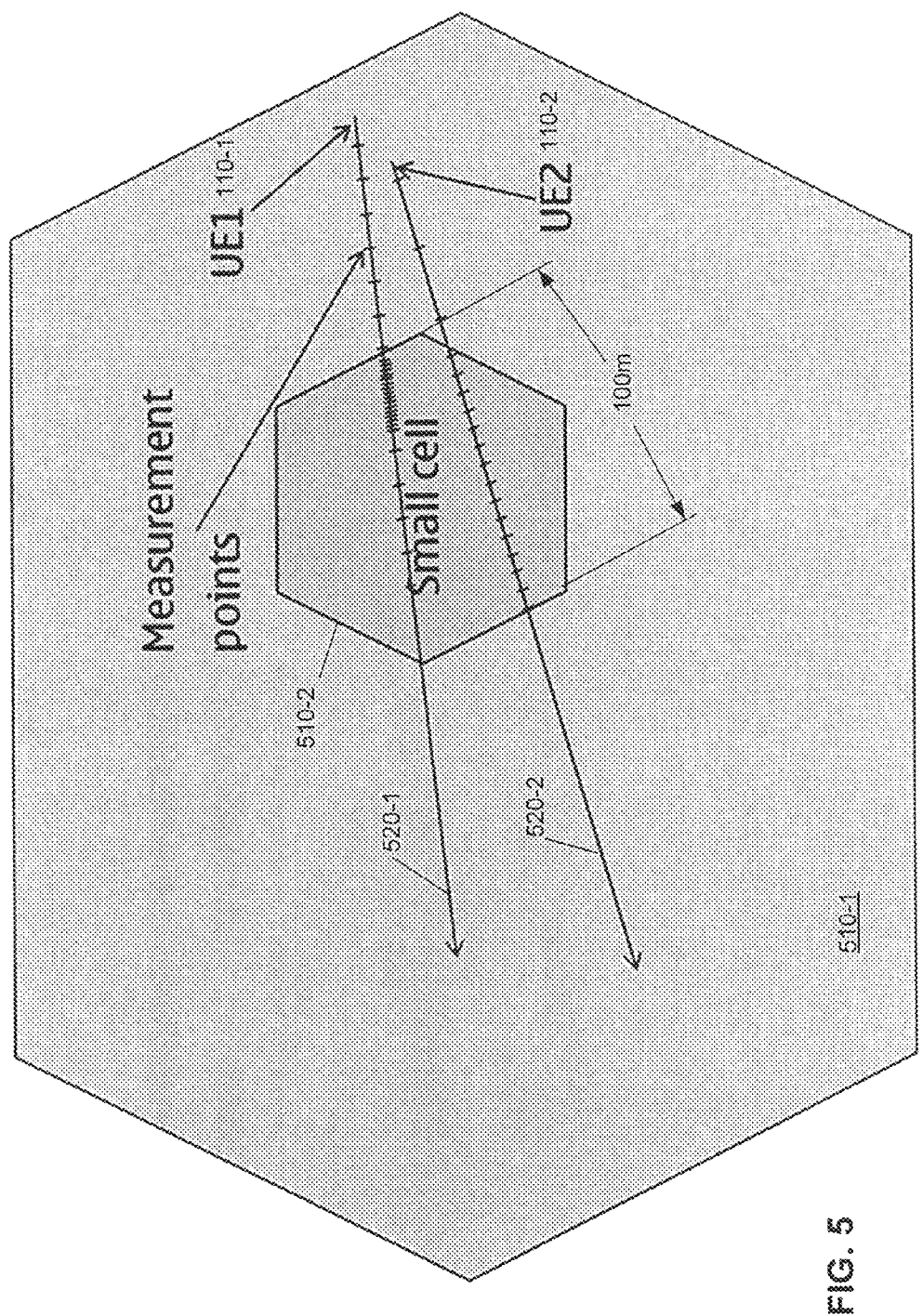
FIG. 5 is an illustration of an exemplary embodiment of increased measurement activity on the UE side after inbound handover from a macro cell to a small cell.

Turning to FIG. 5, an illustration is shown of an exemplary embodiment of increased measurement activity on the UE side after inbound handover from a macro cell 510-1 (e.g., created by eNB 220-1) to a small cell 510-2 (e.g., created by eNB 220-2). This is only one example case. Inbound HO from any cell, such as small or large cells, may also apply the techniques. Additionally, the instant techniques may be applied to entry into a cell, e.g., by RLF. In the specific example of FIG. 5, it is seen that both UEs 110-1 and 110-2 will apply increased measurement activity immediately after inbound handover to the small cell 510-2. In this example the UE1 110-1 is moving at low speed (e.g., a pedestrian) along path 520-1 while UE2 110-1 is moving at higher speed (e.g., 60 km/h) along path 520-2. Even though each UE prior to inbound handover had a given (maybe not even the same) DRX configuration, each UE will apply, after the inbound handover, the increased measurements for a given period of time (note: the increased measurements do not have to be linked to DRX).

For a slow moving UE (here UE1 110-1), this will lead to increased measurements (relative to the measurements occurring prior to handover) for a limited time period. Although the increased measurements are quite unnecessary in this case, they do not have any severe negative impact on the UE as the increased measurements are only performed for a limited time. From FIG. 5, it can be seen that due to slow velocity of the UE, the UE 110-1 will not travel far along path 520-1 during the time the UE takes the additional measurements, but instead the measurement points will be very close in terms in traveled distance along the path 520-1.

For the faster moving UE (here UE2 110-2), the UE2 110-2 will also apply increased measurement activity (in terms of measurements per time period) for a time period after HO. From FIG. 5, it can be seen that due to higher velocity of the UE, the UE 110-2 will travel farther (e.g., relative to the travel by UE 1 along path 520-1) along path 520-2 during the time the UE takes the additional measurements. This makes the measurement points farther apart in terms in traveled distance along the path 520-2 relative to the distance between the measurement points indicated along path 520-1. The increased measurement activity for UE2 110-2 has a positive impact on the robustness of the UE mobility. A reason is that the UE 110-2 will perform the additional measurement also only for a limited time period, but due to the UE velocity, the velocity leads to the UE performing additional measurements while being in the small cell coverage and thereby there will not be an additional delay in outbound handover triggering.

Note that in FIG. 5, after the HO, the measurement interval applied during the increased measurement time period is the same for both UE1 and UE2. That is, the measurement interval is cell dependent in an exemplary embodiment, and not UE or speed dependent.

The basic behavior can be defined in multiple ways. Some non-limiting examples are as follows:

1) The network indicates cell type (e.g., femto, pico, micro cells as non-limiting examples). When a UE enters a cell of, e.g., a femto type, the UE will/shall perform additional measurement for a given time. In general, the cell type is likely something that is indicated by the network to the UE, e.g., either in HO signaling (2a below), broadcast (this one), or the like. One option is of course based on the max cell TX power broadcasted/signaled to the UE and the UE uses this information (but this information is basically still network informed).

a. The time period for which to apply the additional measurements could depend on cell type. The time period could be defined directly in a specification (e.g., 3GPP TS 36.331 or 36.133) or the UE could calculate the time period (e.g., if some defined cell coverage is provided to UE). The cell coverage could be, e.g., indicated in meters, cell type (e.g., small, very small, pico, and the like), or through any other suitable techniques.

2) The network configures the UE to perform the specified behavior, e.g., by using a conventional measurement configuration. This could be performed in the following two exemplary but non-limiting ways:

a. New fields are included in the conventional measurement configuration (e.g., via an information element in HO signaling) indicating the measurement interval as well as the time period. The measurement interval may be expressed as, e.g. an indication of a time period between measurements. The measurement interval may also be expressed as a periodicity, e.g., some number of measurements to be taken over a (e.g., known or received) time period. The measurement interval corresponds to a minimum number of measurements taken over a given time period. Exactly how or when the measurements are taken, e.g., taken with equally spaced distance in time, is left open.

b. Include a new indicator in the measurement configuration which informs the UE to apply this behavior in the cell. Then UE requirements in the RAN4 (a 3GPP working group working on the RF aspects of UTRAN/E-UTRAN) specifications (e.g., 3GPP TS 36.133 for E-UTRAN UE) could be developed to define some limits/requirements for these additional measurements and potentially how long these additional measurements would need to be performed and even their periodicity if periodic measurements are also defined or required.

3) The UE will always, after inbound HO, perform additional measurements for a given time period with a given periodicity.

a. The time period and periodicity could be network configured.

b. The time period and periodicity could be defined in one or more specifications.

c. The time period and periodicity could be UE implemented (but some UE requirements for general UE behaviors could be defined, e.g., in RAN4 specifications like 3GPP TS 36.133).

Exemplary techniques can therefore enable a functionality where the UE will perform additional measurements for a period of time after inbound HO to (e.g., or entering) a small cell. These additional measurements will be performed for limited time period, which could equal the time it would take a UE to cross the cell at a given velocity, which again may be determined by limits given by the mobility parameters in terms of ensuring robust mobility support:

1) If the UE is moving at or at higher velocity than the velocity limit used for calculating the time period during which additional measurements shall be performed (which is again determined by the limit at which robust mobility can be ensured using the given mobility and DRX parameters), this will remove the problem introduced by the combined effect from a high velocity UE in small cell applying DRX. A reason for this removal is that the UE will perform increased/additional measurements during the time the UE is in/served by the small cell coverage and outbound HO triggering will be triggered while having increased measurement activity and will therefore not be delayed. So, if UE is moving fast (e.g., faster than a predetermined speed) then the increased measurement frequency (e.g., reduced measurement periodicity) helps.

2) If on the other hand the UE is not moving that quickly, the impact from performing additional measurements is limited due to the limited time when applying the additional measurements. So, the impact on non-moving/slow moving UE is very limited and if measurements are kept independent from PDCCH monitoring rules (e.g., DRX rules) the power consumption impact can be further reduced to become very limited.

It would be beneficial to have this behavior defined and specified in a manner that can ensure some minimum UE performance. It may not be very beneficial to have a non-specified solution for this behavior, as a non-specified solution does not ensure any guarantee when the non-specified solution becomes UE behavior in the field (and if supported by all UEs). Well-defined behavior among the UEs in the field is beneficial for network planning and for enabling optimal configuration of network and UEs.

In addition to the above-described behavior, in another exemplary embodiment, a UE uses a back off timer, which limits the time period during which additional measurements will be performed. A UE could, based on the small cell coverage, calculate its own maximum time period (e.g. although this will anyway be configurable in some embodiments). For the back off timer, an example is that the UE could, based on own mobility state estimate (MSE), determine the period. For instance, if the UE is moving slowly (normal MSE), the UE would not perform additional measurements; if UE is in high MSE, the UE would perform the additional measurement for, e.g., 20 seconds after HO. The UE will use this maximum time period and implement some limiting options on the UE side, e.g., for guaranteeing limited UE power consumption impact.

The increased measurement activity is not necessarily followed by a PDCCH monitoring requirement (that is, the measuring feature can work independently from DRX). The UE will preferably only be required to perform measurements and there would not (necessarily) be a requirement for the UE to monitor the PDCCH as well. This will ensure absolute minimum UE impact concerning power consumption from this feature. Additionally, separating PDCCH monitoring requirements (e.g., affecting DRX) and the increased measuring techniques herein would enable UE implementation freedom when it comes to the detailed measurement implementation (e.g., can be optimized for different vendors as the implementation suits their algorithms). Also this separation enables minimized impact by the increased measurement feature on UE side in case of mis-configuration from network side. By not linking the additional measurement requirement to PDCCH monitoring rules (which affect DRX) the risk of mis-synchronization between UE and network is also non-existent.

One other way to realize an exemplary embodiment is to combine the increased measurement functionality with the existing long- and short-period DRX behavior. This is not as optimized from a UE power consumption point of view, as this combination would then most likely also require the UE to monitor the PDCCH according to DRX rules. But the combination could be defined such that the UE should apply short DRX for an extended period of time after inbound HO to all or certain cell types. UE measurement points would then be defined according to current convention, with short- and long-period DRX (a problem addressed herein includes long-period DRX and UE movement).

It should be noticed that even though this paper only describes the method by using RRC connected mode mobility (handover based mobility) as example, the method can also be applied to idle mode mobility.

Figure 6:
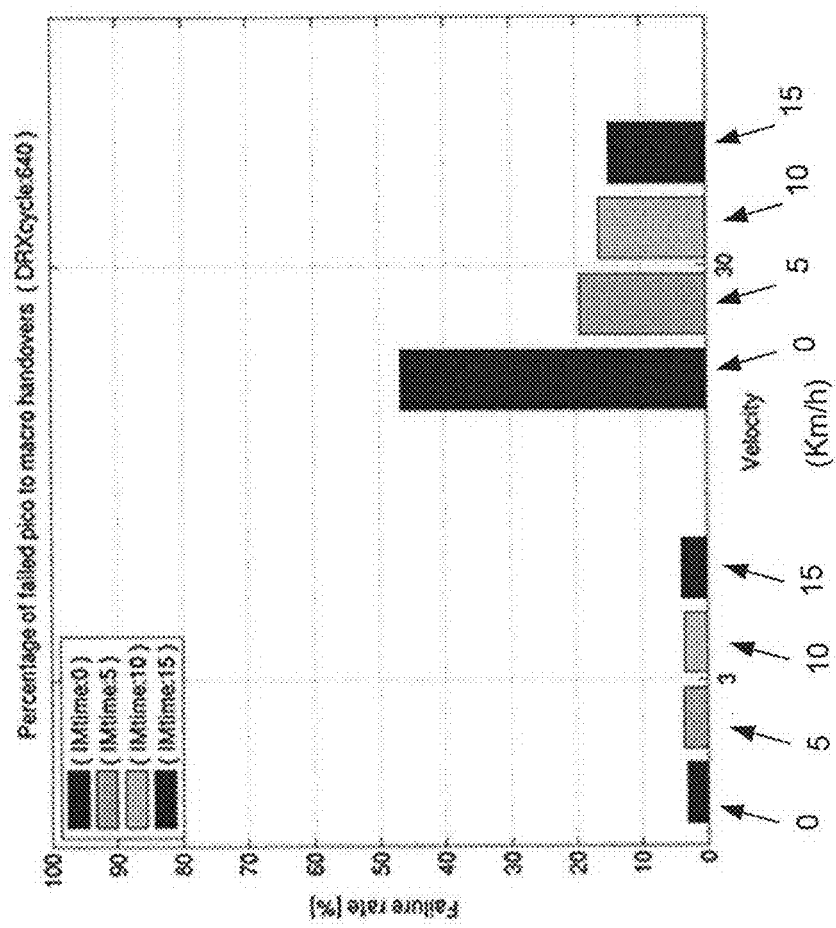
FIGS. 6 and 7 show simulation results from a first run of mobility performance applying an exemplary embodiment of the instant invention.
Figure 7:
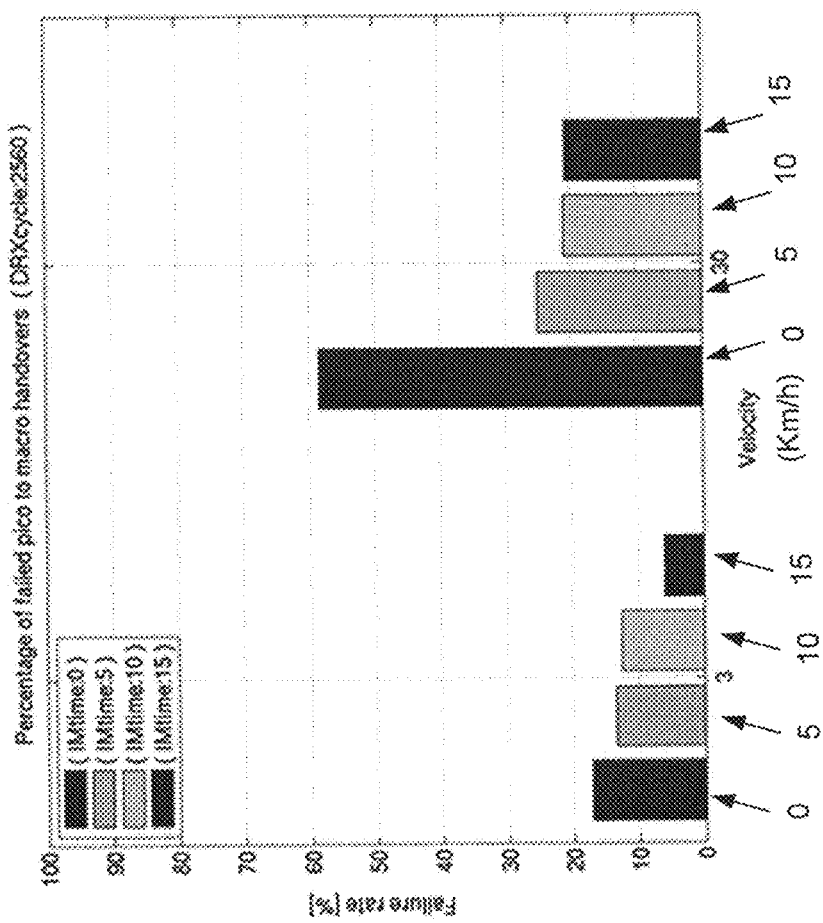

FIGS. 6 and 7 show simulation results from a first run of mobility performance applying the described techniques in an exemplary embodiment. In the simulations 'IMtime0' illustrates the baseline results (as defined for Rel-8/10 without changes) while IMtime5, 10 and 15 indicates the results from applying increased/additional measurements according to the proposed method for 5, 10 and 15 seconds after inbound HO to the cell. FIG. 6 illustrates the case where the DRX=640 ms while FIG. 7 illustrates when DRX=2560 ms is used. As can be seen from FIG. 5, there are no mobility problems when looking at DRX of 640 ms at 3 km/h. If velocity is increased to 30 km/h, HO failures start to occur, but by applying the proposed techniques, the HO failure rate is significantly lowered.

Figure 8:
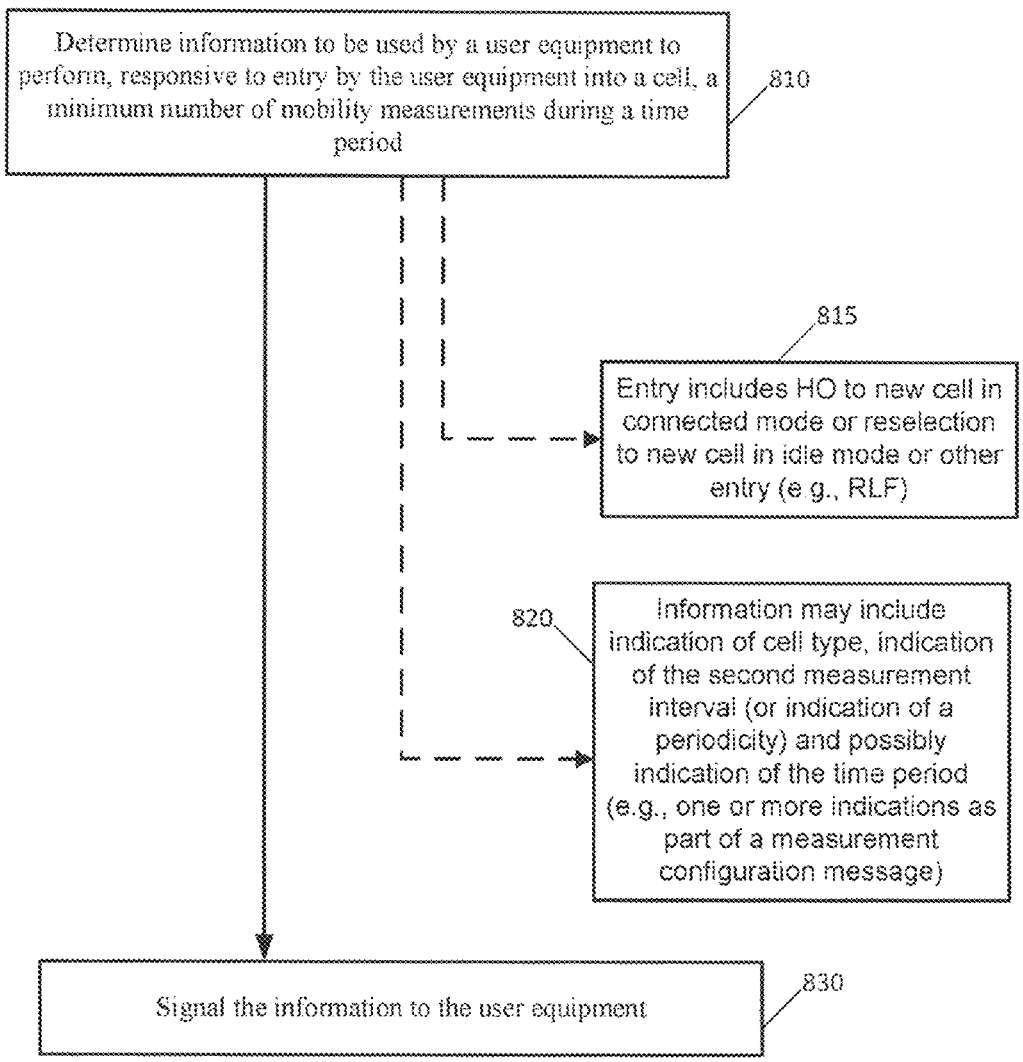
FIG. 8 is a block diagram of a method performed by a network (e.g., base station) for mobility improvement using increased mobility measurements for a time period.

Turning now to FIG. 8, a block diagram is shown of a method performed by a network (e.g., base station) for mobility improvement using increased measurements for a time period. The method may be performed by computer program code 153 executed by the one or more processors 150 or may be performed by hardware (e.g., an integrated circuit configured to perform operations in the method), or by some combination of these. It is assumed for ease of reference that the method of FIG. 8 is performed by an eNB 220, although this is not a limitation on the invention. In block 810, the eNB 220 determines information to be used by a user equipment to perform, responsive to entry by the user equipment into a cell, a minimum number of mobility measurements during a time period.

Block 815 indicates that entry into a cell may include HO to a new cell in connected mode or reselection to new cell in idle mode or other entry (e.g., caused by RLF). Block 820 indicates the type of information that may be signaled. Such information may include indication of cell type, indication of the second measurement interval (or indication of a periodicity from which the interval may be determined) and possibly indication of the time period. One or more of these indications may be signaled as part of a measurement configuration message. In block 830, the eNB 220 signals the information to a user equipment.

Figure 9:
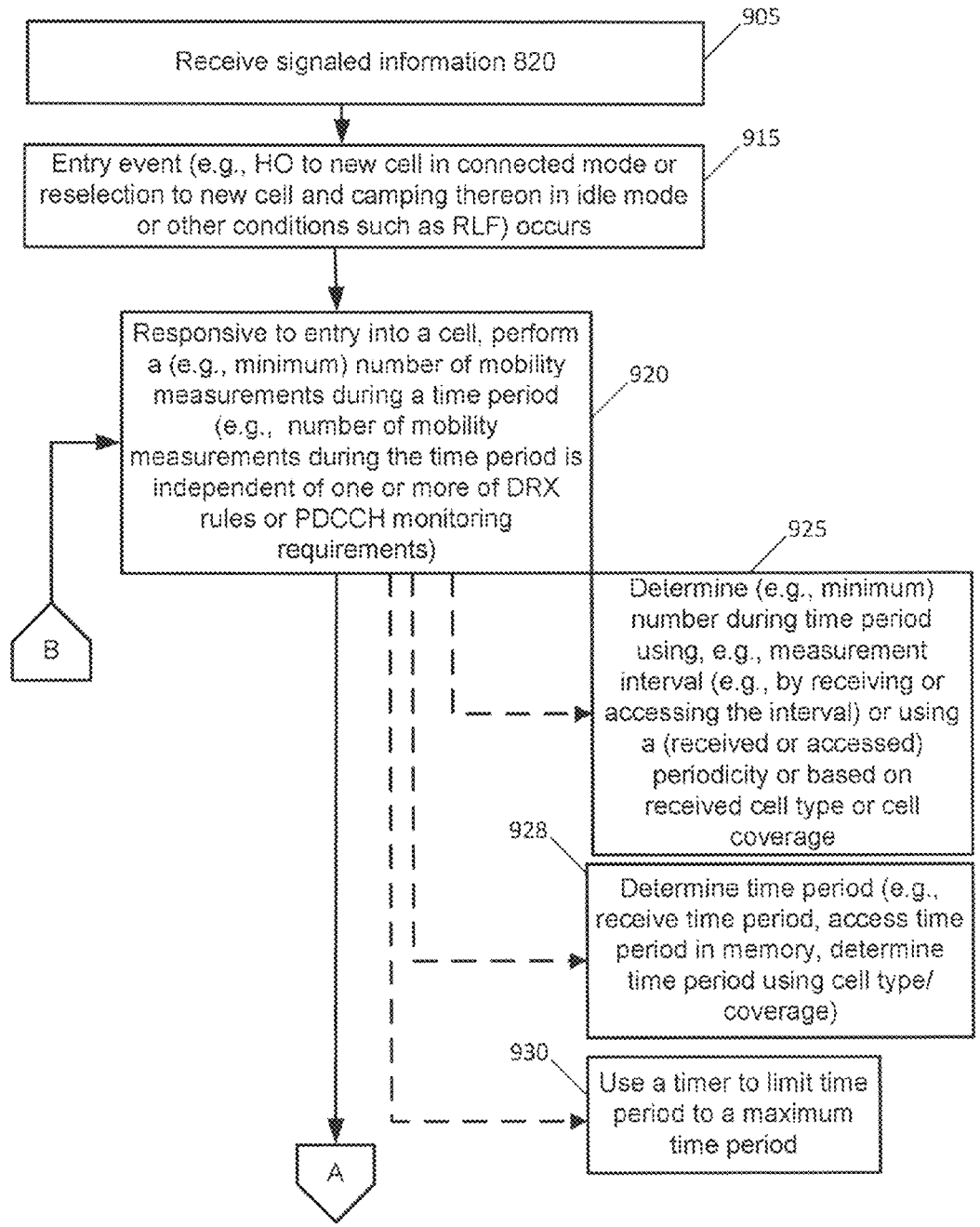
FIG. 9 is a block diagram of a method performed by a user equipment for mobility improvement using increased mobility measurements for a time period.
Figure 9:
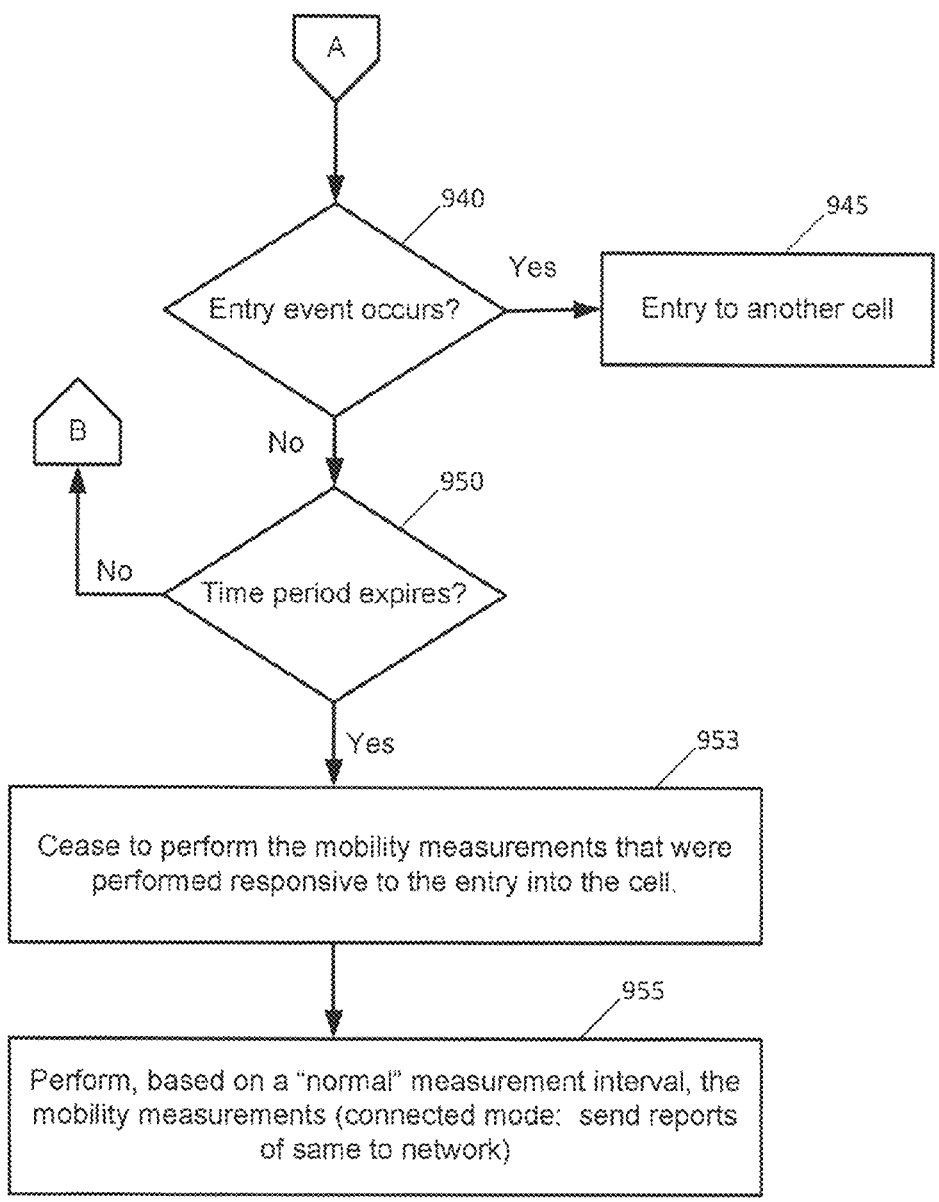

FIG. 9 is a block diagram of a method performed by a user equipment for mobility improvement using increased measurements for a time period. The method may be performed by computer program code 123 executed by the one or more processors 125 or may be performed by hardware (e.g., an integrated circuit configured to perform operations in the method), or by some combination of these. In block 905, the UE 110 receives signaled information 820. Some or all of block 905 may be optional, as some or all of the parameters may be defined via a standard.

In block 915, an entry event occurs. The entry event includes a HO to new cell in connected mode or reselection to new cell and camping thereon in idle mode or entry into a cell due to other conditions (e.g., RLF). In block 920, the UE, responsive to entry into a cell, performs a (e.g., minimum number) of mobility measurements during a time period. The number of mobility measurements during the time period may be independent of one or more of DRX rules or PDCCH monitoring requirements. Block 925 indicates the (e.g., minimum) number of mobility measurements during the time periods may be determined using, e.g., a measurement interval (e.g., by receiving or accessing the interval) or using a (received or accessed) periodicity or based on received cell type. That is, a selected interval may be used to perform the number of measurements, and the selected interval may also be determined using a periodicity. The measurements are taken typically within some maximum interval (although a UE may take more measurements within the maximum interval) and the measurements are performed for a time period. That is, a UE 110 should not go longer than the maximum interval without taking a measurement. It could also be possible for the UE to use a minimum interval, such that the UE should take a measurement at least at the minimum interval. It should be noted that the maximum (or minimum) interval (as a selected interval) and the period of time can yield a minimum number of measurements during that time period, although the UE 110 may perform additional measurements in the time period. In block 928, the UE 110 determines the time period. The time period may be determined by receiving the tune period, accessing the time period in memory, or determining the time period using a cell type/coverage. Standards-defined measurement interval or periodicity may be accessed via memory. Block 930 further indicates the UE 110 may use a timer to limit time period to a maximum time period.

In block 940, it is determined if another entry event has occurred. If not (block 940=No), then it is determined if the time period has expired in block 950. If not (block 950=No), the method continues in block 930. If so (block 950=Yes), in block 933, the UE ceases to perform the mobility measurements that were performed responsive to the entry into the cell. In block 955, the UE 110 performs, based on the normal measurement interval (e.g., based on one or more of DRX rules or PDCCH monitoring requirements), the mobility measurements. In connected mode, the UE sends reports of the mobility measurements to the network.

If an attachment event has occurred (block 940=Yes), then the UE 110 attaches to another (e.g., original macro or a different) cell. Note that this attachment may cause block 920 to be performed or cause the UE 110 to take mobility measurements based on the "normal" measurement interval, depending on the situation.

Without in any way limiting the scope, interpretation, or application of the above, a technical effect of one or more of the example embodiments disclosed herein is to provide increased measurements in response to a user equipment entry into cell (e.g., cell reselection or handover or RLF) for a time period.

The following exemplary items have been described above and are further described below. A method include: responsive to entry into a cell, performing a minimum number of mobility measurements during a time period; and after expiration of the time period, ceasing to perform the mobility measurements that were performed responsive to the entry into the cell.

2. The method of item 1, further comprising, after expiration of the time period, performing mobility measurements based on one or more of DRX rules or PDCCH monitoring requirements.

3. The method of item 1, wherein performing the minimum number of mobility measurements during the time period is independent of one or more of DRX rules or PDCCH monitoring requirements.

4. The method of item 1, further comprising determining a measurement interval, and performing further comprises performing the minimum number of mobility measurements during the time period based on the determined measurement interval.

5. The method of item 4, wherein determining the measurement interval further comprises receiving an indication of the measurement interval and using the indication to determine the measurement interval.

6. The method of item 1, further comprising determining a periodicity and performing further comprises performing the minimum number of mobility measurements during the time period based on the determined periodicity.

7. The method of item 6, wherein determining the periodicity further comprises receiving an indication of the periodicity and using the indication to determine the periodicity.

8. The method of any one of items 5 or 7, wherein an indication is received in a measurement configuration.

9. The method of item 8, wherein the measurement configuration further comprises an indication of the time period.

10. The method of item 4, further comprising determining the measurement interval by accessing a memory to determine a value for the measurement interval.

11. The method of item 6, further comprising determining the periodicity by accessing a memory to determine value for the periodicity.

12. The method of any one of items 2 to 8, 10, or 11, further comprising accessing the memory to determine the time period.

13. The method of item 1, further comprising receiving an indication of a cell type for the cell and performing the minimum number of mobility measurements during the time period based on the cell type.

14. The method of item 1, further comprising receiving an indication of cell coverage corresponding to the cell and performing the minimum number of mobility measurements during the time period based on the cell coverage.

15. The method of any of the preceding items, further comprising using a timer to limit the time period to a maximum time period.

16. The method of any one of items 1 to 15, wherein the mobility measurements are performed by a user equipment that is in a connected mode and the entry into the cell is a handover to the cell.

17. The method of any one of items 1 to 15, wherein the mobility measurements are performed by a user equipment that is in an idle mode and the entry into the cell is a camping on the cell.

18. The method of any one of items 1 to 15, wherein the mobility measurements are performed by a user equipment that is in a connected mode and the entry into the cell is caused by a radio link failure.

19. The method of any one of the preceding items, wherein the mobility measurements are performed during only a portion and not all of the time period because entry to a second cell occurs within the time period.

An apparatus includes one or more processors, and one or more memories including computer program code. The one or more memories and the computer program code configured to, with the one or more processors, cause the apparatus to perform any of the methods of 1-19 above.

An apparatus includes means for performing any of the methods of 1-19 above.

A computer program product comprising a computer-readable medium bearing computer program code embodied therein for use with a computer, the computer program code comprising code for performing any of the methods of 1-19 above.

20. A method includes: determining information to be used by a user equipment to perform, responsive to entry by the user equipment into a cell, a minimum number of mobility measurements during a time period; and signaling the information to the user equipment.

21. The method of item 20, wherein determining further comprises determining a measurement interval to be used by the user equipment to perform the minimum number of mobility measurements during the time period, and signaling further comprises signaling an indication of the determined measurement interval to the user equipment.

22. The method of item 20, wherein determining further comprises determining a periodicity to be used by the user equipment to perform the minimum number of mobility measurements during the time period, and signaling further comprises signaling an indication of the determined periodicity to the user equipment.

23. The method of any one of items 21 or 22, wherein signaling further comprises signaling the indication in a measurement configuration.

24. The method of item 23, wherein the measurement configuration further comprises an indication of the time period.

25. The method of item 20, wherein determining further comprises determining a cell type for the cell and signaling further comprises signaling an indication of the cell type to the user equipment.

26. The method of item 20, wherein determining further comprises determining a cell coverage for the cell and signaling further comprises signaling an indication of the cell coverage to the user equipment.

27. The method of any one of items 20 to 26, wherein the mobility measurements are to be performed by the user equipment that is in a connected mode and the entry into the cell is a handover to the cell.

28. The method of any one of items 20 to 26, wherein the mobility measurements are to be performed by the user equipment that is in an idle mode and the entry into the cell is a camping on the cell.

29. The method of any one of items 20 to 26, wherein the mobility measurements are to be performed by the user equipment that is in a connected mode and the entry into the cell is caused by a radio link failure.

An apparatus includes one or more processors, and one or more memories including computer program code. The one or more memories and the computer program code configured to, with the one or more processors, cause the apparatus to perform any of the methods of 21-29 above.

An apparatus includes means for performing any of the methods of 21-29 above.

A computer program product comprising a computer-readable medium bearing computer program code embodied therein for use with a computer, the computer program code comprising code for performing any of the methods of 21-29 above.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., memories 125, 155 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
performing by a user equipment, responsive to the user equipment entry into a cell of a network, according to a selected interval a plurality of measurements of the cell during a time period while being in a coverage area of the cell, wherein the plurality measurements of the cell are performed during the time period according to the selected interval more frequently than and independently from existing measurement configurations applied by the network to the cell; and ceasing, after expiration of the time period, to perform the plurality of measurements of the cell that were performed responsive to the entry into the cell.

2. The method of claim 1, further comprising, after expiration of the time period, performing measurements based on one or both of discontinuous reception rules or physical downlink control channel monitoring requirements.

3. The method of claim 1, wherein performing the plurality of measurements according to the selected interval during the time period is independent of one or both of discontinuous reception rules or physical downlink control channel monitoring requirements.

4. The method of claim 1, further comprising determining the selected interval, and wherein performing further comprises performing the plurality of measurements during the time period based on the determined selected interval.

5. The method of claim 1, further comprising determining a periodicity and determining the selected interval based on periodicity.

6. The method of claim 1, further comprising receiving an indication of a cell type for the cell and performing according to the selected interval the plurality of measurements during the time period based on the cell type.

7. The method of claim 1, further comprising receiving an indication of cell coverage corresponding to the cell and performing according to the selected interval the plurality of measurements during the time period based on the cell coverage.

8. The method of claim 1, further comprising using a timer to limit the time period to a maximum time period.

9. The method of claim 1, wherein the plurality of measurements are performed by the user equipment that is in a connected mode and the entry into the cell is a handover to the cell.

10. The method of claim 1, wherein the plurality of measurements are performed by the user equipment that is in an idle mode and the entry into the cell is a camping on the cell.

11. The method of claim 1, wherein the plurality of measurements are performed by the user equipment that is in a connected mode and the entry into the cell is caused by a radio link failure.

12. A computer program product comprising a non-transitory computer-readable storage medium bearing computer program code embodied therein for use with a computer, the computer program code comprising code for performing the method of claim 1.

13. An apparatus, comprising:
one or more processors; and
one or more memories including computer program code, the one or more memories and the computer program code configured, with the one or more processors, to cause the apparatus to perform at least the following:
performing, responsive to entry into a cell of a network, according to a selected interval a plurality of measurements of the cell during a time period while being in a coverage area of the cell, wherein the plurality of measurements of the cell are performed during the time period according to the selected interval more frequently than and independently from existing measurement configurations applied by the network to the cell; and ceasing, after expiration of the time period, to perform the plurality of measurements of the cell that were performed responsive to the entry into the cell.

14. A method, comprising:
determining information to be used by a user equipment to perform, responsive to entry by the user equipment into a cell of a network, a plurality of measurements of the cell according to a selected interval during a time period while being in a coverage area of the cell, wherein the plurality of measurements of the cell are performed during the time period according to the selected interval more frequently than and independently from existing measurement configurations applied by the network to the cell; and
signaling the information to the user equipment.

15. The method of claim 14, wherein determining further comprises determining the selected interval to be used by the user equipment to perform the plurality of measurements using the selected interval during the time period, and signaling further comprises signaling an indication of the determined selected interval to the user equipment.

16. The method of claim 14, wherein determining further comprises determining a periodicity to be used by the user equipment to determine the selected interval, and signaling further comprises signaling an indication of the determined periodicity to the user equipment.

17. The method of claim 14, wherein signaling further comprises signaling the indication in a measurement configuration.

18. The method of claim 17, wherein the measurement configuration further comprises an indication of the time period.

19. The method of claim 14, wherein determining further comprises determining a cell type for the cell and signaling further comprises signaling an indication of the cell type to the user equipment.

20. The method of claim 14, wherein determining further comprises determining a cell coverage for the cell and signaling further comprises signaling an indication of the cell coverage to the user equipment.

21. A computer program product comprising a non-transitory computer-readable storage medium bearing computer program code embodied therein for use with a computer, the computer program code comprising code for performing the method of claim 14.

22. An apparatus, comprising:
one or more processors; and
one or more memories including computer program code, the one or more memories and the computer program code configured, with the one or more processors, to cause the apparatus to perform at least the following:
determining information to be used by a user equipment to perform, responsive to entry by the user equipment into a cell of a network, a number of measurements of the cell according to a selected interval during a time period while being in a coverage area of the cell, wherein the number of measurements of the cell are performed during the time period according to the selected interval more frequently than and independently from existing measurement configurations applied by the network to the cell; and
signaling the information to the user equipment.

* * * * *

UNITED STATES PATENT AND TRADEMARK OFFICE
CERTIFICATE OF CORRECTION

PATENT NO. : 9,148,812 B2
APPLICATION NO. : 13/753646
DATED : September 29, 2015
INVENTOR(S) : Dalsgaard et al.

Page 1 of 1

It is certified that error appears in the above-identified patent and that said Letters Patent is hereby corrected as shown below:

In the Claims

Claim 1, col. 15, line 2 --of-- should be inserted in between "plurality" and "measurements".

Signed and Sealed this
Ninth Day of February, 2016

Michelle K. Lee
*Director of the United States Patent and Trademark Office*